Figure 1:
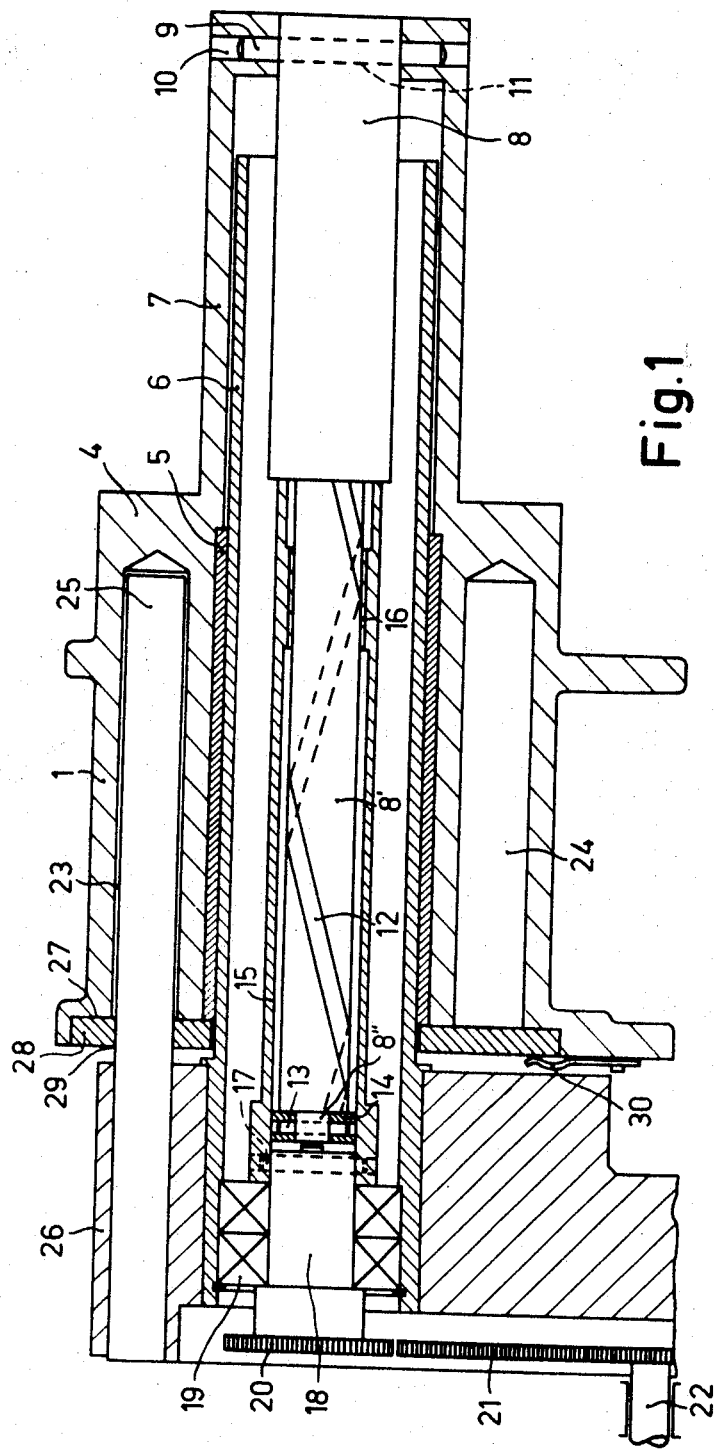

United States Patent [19]

Kuppens

[11] 3,753,614

[45] Aug. 21, 1973

[54] CINEMATOGRAPHIC PROJECTOR
[75] Inventor: Bernardus Johannes Kuppens, Emmasingel, Eindhoven, Netherlands
[73] Assignee: U.S. Philips Corporation, New York, N.Y.
[22] Filed: Apr. 24, 1972
[21] Appl. No.: 247,157

[30] Foreign Application Priority Data
May 4, 1971 Netherlands....................... 7106038

[52] U.S. Cl. .............................................. 352/142
[51] Int. Cl. ............................................... G03b 3/00
[58] Field of Search ..................................... 352/142

[56] References Cited
FOREIGN PATENTS OR APPLICATIONS
903,302 8/1962 Great Britain...................... 352/142

Primary Examiner—Samuel S. Matthews
Assistant Examiner—Russell E. Adams, Jr.
Attorney—Frank R. Trifari

[57] ABSTRACT

Cinematographic projector including a translatable and rotatable objective turret which is secured to a spindle in which a helical groove has been formed. The spindle is surrounded by a rotatably supported and axially immovable sleeve which internally is provided with a projection engaging in the groove in the spindle and is rotatable by a drive motor. When the motor is started the turret is initially moved in a straight line to an extended position until a stop provided on the spindle abuts against the projection of the sleeve, whereupon the spindle and the turret are rotated as an integral unit together with the sleeve. By reversing the direction of rotation of the motor the turret is returned in a straight line.

6 Claims, 2 Drawing Figures

Patented Aug. 21, 1973

3,753,614

2 Sheets-Sheet 1

CINEMATOGRAPHIC PROJECTOR

The invention relates to a cinematographic projector which includes an objective turret in which different objectives are mounted, a drive motor by means of which the turret can be rotated and means enabling the turret prior to rotation to be moved in a straight line from a projection position to an extended position and to be moved in the opposite direction subsequent to rotation.

In a known cinematographic projector of this type the means for displacement of the turret in a straight line is in the form of suction magnets which effect the translation of the turret in both directions. The rotation of the turret is performed by means of the drive motor. The use of suction magnets for the translatory movement has the drawback that their operation is greatly dependent upon the position of the projector which must be arranged so as to be truly horizontal. When the projector is inclined additional springs are required to assist the action of the suction magnets. Moreover, the translation of the turret produced by the suction magnets involves shocks which may cause damate to the objectives It is an object of the present invention to avoid the said disadvantages. This is accomplished by providing a cinematographic projector having means for moving the turret in a straight line comprising two elements, a spindle and a sleeve, having with co-operating screwthreads. One element is connected to the rotatable and translatable turret. The other element is rotatably but axially immovably supported and is coupled to the drive motor by a driving connection. Stops are provided which limit the straight-line displacement in the extended position of the turret.

An advantage of the invention provide is that both the translation and the rotation of the turret are obtainable by means of one drive motor, a necessary element in any case. Movement of the turret may thus be effected independently of the position of the projector and also smoothly and gradually, i.e., without shocks or jolts. When the drive motor is started the element coupled to it will be rotated and the element secured to the turret will initially be moved in a straight line with respect to the other element, the turret moving towards the extended position. The comparatively large mass of the turret prevents it from following the rotary movement of the other element driven for rotation. When the two elements have reached given positions shifted with respect to one another, the stops become operative so that on continued rotation of the said other element both elements and the turret are rotated as an integral unit. When the turret has been rotated into the angular position desired for another projection position the direction of rotation of the drive motor is reversed, so that the element coupled to the motor is driven in the opposite direction. As a result that the element connected to the turret and hence the turret itself, are returned along a straight line in the opposite direction to the other projection position.

A suitable embodiment of the invention provides that the element connected to the turret is the spindle. At least one helical groove is formed in the spindle, and the sleeve is provided with an inner projection which co-operates with this groove. The spindle is provided with the said stops which, in given positions of the spindle and the sleeve, in which these elements are axially shifted with respect to one another, butt against the inner projection of the sleeve.

According to the invention the spindle and the sleeve are preferably surrounded by a tubular or box-shaped projector housing part, the turret including a hub part which is guided by the said tubular or box-shaped housing part. Thus, an advantageous axial structural length is obtained.

A further feature of the invention is that the hub part of the turret is provided with axial bores, the axes of which are equally spaced from the rotation axis of the turret, and at least one axially extending fixed guide pin is provided which in each of the projection positions is inserted into one of the axial bores in the hub. The pins are inserted through a distance such that on displacement of the turret from a projection position to the extended position the pin guides the turret, but after the latter has reached the extended position permits it to rotate. This provides additional straight-line guidance of the turret. The guide pin has the additional advantage that it can fix the projection positions of the turret.

According to the invention there is preferably formed in an end face of the turret hub which, viewed in the direction of displacement from a projection position to the extended position, constitutes the rear end face a chamber which accommodates a friction disk which surrounds the tubular or box-shaped projector housing part with a certain amount of clearance and is provided with an opening through which the guide pin is inserted into one of the axial bores in the hub. Resilient means are provided which are secured at one end thereof to the said end face of the hub and at the other end press against the friction disk. The turret in its extended position is rotatable with respect to the disk but the disk in this position is locked against rotation by the guide pin. Thus it is ensured that in the extended position of the turret, in which position the guide pin has left the associated axial bore in the hub, the turret cannot be set into rotation too suddenly. Because the friction produced between the friction disk and the hub this rotation is effected gradually.

Figure 2:
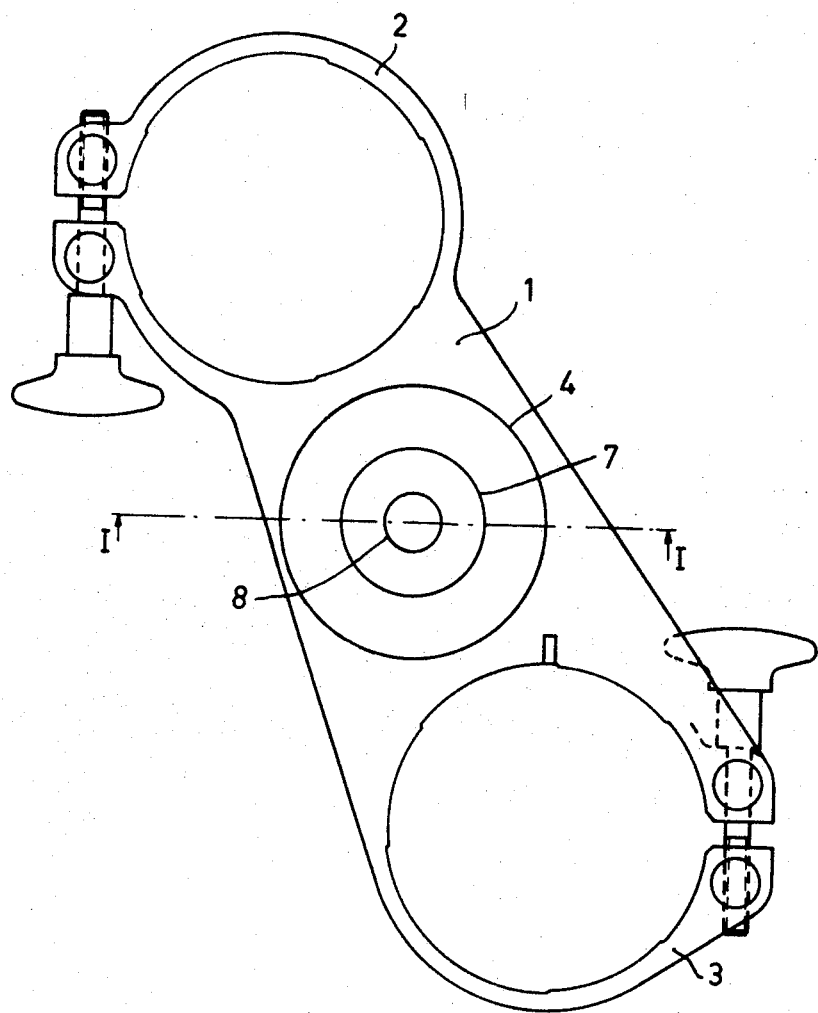

An embodiment of the invention will now be described, by way of example, with reference to the accompanying diagrammatic drawings, in which:

FIG. 1 is a longitudinal sectional view of a part of a cinematograph projector, which part includes the driving means for a translatable and rotatable turret according to the invention, the turret being shown in a projection position, and FIG. 2 is an elevation of the turret viewed from the right-hand side in FIG. 1.

Referring now to the Figures, a turret 1 is provided with several, in the embodiment shown two, mounts 2 and 3 in which projection objectives, not shown, are mounted. The turret 1 has a hub part 4 in which a liner 5 is placed by which, in a manner to be described more fully hereinafter, the turret is slidably and rotatably guided respectively over and about the outer circumference of the stationary cylindrical part 6 of a projector housing. The hub part 1 is provided with a tubular or box-shaped extension 7 which, at its right-hand end in FIG. 1, is connected to a spindle 8 which extends axially in the projector housing part 6. In the embodiment shown the connection between the extension 7 of the turret hub and the spindle 8 is established by a pin 9 which has been driven into aligned radial bores 10 and 11 in the extension 7 and the spindle 8 respectively. It should be noted, however, that this manner of connection is not essential to the invention.

The spindle 8 has a portion 8' of reduced diameter in which a helical groove 12 has been formed and which terminates in a portion 8" of still further reduced diameter on which a ring 14 the outer diameter is slightly greater than the diameter of the spindle portion 8' has been fixed by means of a pin 13. The spindle portion 8' is surrounded by a sleeve 15 which is internally provided with a helical rib 16 which co-operates with the helical groove 12 in the spindle portion 8'. The sleeve 15 protrudes axially beyond the spindle portion 8", and the protruding end is fixed by a pin 17 to a stub axle 18 which by means of bearings 19 is rotatably but not axially displaceably supported in the projector housing part 6. To the end of the stub axle 18 remote from the sleeve 15 there is secured a gearwheel 20 which meshes with a gearwheel 21 mounted on a shaft 22 which is arranged to be driven by a drive motor, not shown.

The hub part 4 of the turret has been formed with, in this embodiment two, axial bores 23 and 24 the axes of which are equally spaced from the spindle 8 of the turret. In the position of the turret shown in FIG. 1 a guide pin 25 secured in a frame part 26 of the projector has been inserted in the axial bore 23 in the turret hub. In the end face of the hub 4 which faces the frame part 26 of the projector there has been recessed a chamber 27 which accomodates a friction disk 28 which surrounds the projector housing part 6 with a certain amount of clearance and is provided with an opening 29 through which the guide pin 25 is inserted in the bore 23 in the hub. The disk 28 is accommodated in the chamber 27 with a fit such that during the process of interchanging the objective, which process will be described more fully hereinafter, the turret is rotatable about the disk 28 with the production of a certain amount of frictional forces. Axial displacement of the friction disk 28 relative to the hub 4 is prevented by at least one thrust spring 30 which is secured to the end face of the hub and is pressed against the outer surface of the friction disk.

The operation of the aforedescribed arrangement is as follows. FIG. 1 shows the turret in an operative position, for example in the position in which a film is projected by means of the objective fixed in the mount 2. When this objective is to be exchanged for the other objective fixed in the mount 3 the drive motor is started so as to run in an appropriate direction of rotation, thereby rotating the sleeve 15 via the gears 21, 20. Since the rib 16 on the sleeve 15 engages in the groove 12 in the spindle 8, this rotation of the sleeve will cause the spindle 8 which carries the turret 1 to move in a straight line along the projector housing part 6 outwards, to the right in FIG. 1, until the ring mounted on the stub axle butts against the rib 16. At this instant the fixed guide pin 25 has left the bore 23 in the turret hub 4 but still is inserted in the opening 29 in the friction disk 28. When the ring 14 secured to the spindle 8 butts against the rib 16 on the sleeve 15, further rotation of the sleeve will cause the spindle and hence the turret to be rotated. This rotation of the turret will start gradually, because a certain amount of friction is produced between the rotating turret and the friction disk which in the extended position of the turret is locked against rotation by the guide pin 25. When the turret has been rotated through the desired angle, which is determined by stops, not shown, the direction of rotation of the drive motor is reversed so that the sleeve will rotate in the opposite direction, with the result that the spindle 8 carrying the turret 1 returns in a straight line from the extended position to the other projection position. The guide pin 25 which still is within the opening 29 in the friction disk 28 then is inserted in the corresponding bore 24 in the turret hub. From the above it will be apparent that the friction disk and the turret are capable as an integral unit of moving in a straight line along the projector housing part 6 and that the turret in the extended position is rotatable about the friction disk, which itself is locked against rotation by the pin 25. The friction disk is provided to ensure that after the turret has been moved into the extended position, the subsequent rotation of the turret is not too abrupt.

It should be noted that the invention is not restricted to the aforedescribed embodiment shown in the drawings. The invention also relates to embodiments in which the helical groove is formed in the sleeve and the spindle is provided with the projection or rib which cooperates with this groove, and to embodiments in which the turret is connected to the sleeve and the spindle is coupled to the drive motor, in which case the spindle is the element which is rotatably but axially immovably supported.

What is claimed is:

1. In a cinematographic projector the combination comprising a rotatable turret arranged for axial displacement between a projection position and an extended position, plural means mounted on said turret for supporting projection objectives, a drive motor carried by said projector for rotating said turret between a plurality of projection positions, a spindle element and sleeve element assembly carried by said projector, one of said elements being rotatably supported in the projector and axially immovable, means coupling said drive motor to said axially immovable element, the other of said elements being connected to said turret, cooperating engagement means carried by said spindle and sleeve so that upon rotation of said one of said elements in one direction said other element will be caused to be axially displaced so as to displace said turret from said projection position to said extended position, stop means carried by said projector for limiting the axial displacement of said turret at said extended position, means for permitting said turret to rotate when in said extended position upon continued operation of said drive motor, and means for reversing direction of said drive motor so as to cause said turret to be axially displaced from said extended position to said projection position.

2. The cinematographic projector according to claim 1 wherein said element connected to the turret is the spindle, said cooperating engagement means comprising at least one helical groove formed in the spindle, and an inner projection provided on said sleeve cooperating with said groove, said stop means being carried by said spindle and arranged for engagement with said inner projection when said turret is axially displaced to the extended position.

3. The cinematographic projector according to claim 1 further comprising a substantially tubular guide housing surrounding said spindle and sleeve assembly, and a hub of said turret being guided during axially displacement thereof by said guide housing.

4. The cinematographic projector according to claim 3 further comprising a plurality of axial bores in the turret, the axes of said bores being equally spaced from the axis of rotation of said turret, and at least one axially extending fixed guide pin inserted into one of said axial bores in the hub when the turret is in each of said projection positions, said pin being inserted to a distance so as to guide said turret when displaced from a projection position to the extended position, said pin being removed from one of said bores when said turret is at the extended position so as to permit said turret to rotate.

5. The cinematographic projector according to claim 4 further comprising a chamber located at the end face of said hub of said turret seen when viewed in the direction of movement of the turret from a projection position to an extended position, a friction disk carried within said chamber and surrounding said substantially tubular guide housing with clearance, an opening in said disk for accommodating therethrough said guide pin arranged for insertion into one of said axial bores, and resilient means secured at one end thereof to said end face of said hub and at the other end thereof urged against said friction disc so that when said turret is in its extended position the turret will be permitted to rotate with respect to said disk and said disk will be locked against rotation by said guide pin.

6. In a cinematographic projector the combination comprising a rotatable and axially displaceable turret arranged within said projector for movement between one of a plurality of projection positions and an extended position in which said turret may rotate, a plurality of mounting means on said turret for supporting projection objectives, means for rotating said turret from one projection position to another when said turret is in said extended position, extension means carried by said projector and engaging said turret for causing displacement thereof, means coupling said engagement means to said means for rotating said turret so as to produce axial displacement of said turret, stop means arranged for engagement with said extension means for limiting the axial displacement of said turret, and means for reversing direction of said means for rotating said turret so as to cause said turret to be axially displaced from the extended position to another of said projection positions.

* * * * *